United States Patent
Corcos et al.

(10) Patent No.: US 10,386,478 B2
(45) Date of Patent: Aug. 20, 2019

(54) RANGE-INDEPENDENT RESOLUTION RADAR

(71) Applicant: International Business Machines Corporation, Armonk, NY (US)

(72) Inventors: Dan Corcos, Tel Aviv (IL); Danny Elad, Moshav Liman (IL); Ofer Markish, Nesher (IL); Thomas E Morf, Gross (CH)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 15/157,425

(22) Filed: May 18, 2016

(65) Prior Publication Data
US 2017/0336506 A1    Nov. 23, 2017

(51) Int. Cl.
*G01S 13/89*    (2006.01)
*G01S 7/03*    (2006.01)
*G01S 13/00*    (2006.01)
*G01S 13/87*    (2006.01)
*H01Q 19/06*    (2006.01)

(52) U.S. Cl.
CPC ............... *G01S 13/89* (2013.01); *G01S 7/03* (2013.01); *G01S 13/003* (2013.01); *G01S 13/878* (2013.01); *H01Q 19/062* (2013.01)

(58) Field of Classification Search
CPC .......... G01S 13/89; G01S 7/35; H01Q 9/0407

USPC .......................................................... 342/88
See application file for complete search history.

(56) References Cited

U.S. PATENT DOCUMENTS

| | | | |
|---|---|---|---|
| 7,535,409 B1 * | 5/2009 | Choe ....................... | G01S 7/282 342/159 |
| 2006/0241409 A1 * | 10/2006 | Winters ................... | A61B 5/05 600/430 |
| 2007/0140526 A1 * | 6/2007 | Pirim .................... | G06K 9/6212 382/103 |
| 2013/0235059 A1 * | 9/2013 | Yamamoto ............... | H04N 9/75 345/589 |
| 2017/0131398 A1 * | 5/2017 | Younis .................. | G01S 13/753 |

FOREIGN PATENT DOCUMENTS

GB    2318010    *    4/1998

* cited by examiner

*Primary Examiner* — Timothy X Pham
(74) *Attorney, Agent, or Firm* — Gregory J. Kirsch (57) ABSTRACT

Embodiments of the present invention allow for radar imaging that is not range dependent for resolution. Arrays of cells comprised of antennas and true delays can be placed behind the target. The signal reflected by the individual cells provides information on whether the cell is blocked by the target. Additional information can be determined from the radar returns, such as material properties and target thickness. Similar structures can be constructed to act as wireless barcodes.

19 Claims, 10 Drawing Sheets

RANGE-INDEPENDENT RESOLUTION RADAR

BACKGROUND

The spatial resolution of radar systems typically depends on the beamwidth, the size of the radar antennas, and the distance between the radar and the target. Consequently, there is typically a tradeoff between these factors and achievable resolution in radar sensing.

Traditionally, spatial resolution could be increased by increasing the antenna size. For example, as the antenna aperture size is increased, the beamwidth of the antenna (i.e., 3 dB attenuation with respect to the peak) decreases. An approximate expression for the inverse relation between the antenna size (D) and the 3 dB beamwidth (BW) for a horn antenna is BW=70$\lambda$/D, where $\lambda$ is the wavelength. As a result of the decreased beamwidth, the spot size on the target decreases as well, enabling the detection of smaller features on the target. The enlargement of the antenna size needs to be done on either or both the transmitter's and the receiver's antennas of the radar in order to improve the radar resolution. However, the use of large antennas, such as large reflector dishes or arrays of antenna elements, can increase the system cost, size, and weight. In addition, it may be necessary to mechanically rotate or move the antenna or target in order to observe different features on the target such that the relevant area on the target would be illuminated. Larger antennas can be made by constructing phased arrays that use, for example, digital beamforming, or multi-static methods. However, phased array antennas add complexity in the form of individual feeds, transceivers, and phase shifters, and/or processing sections.

Figure 1:
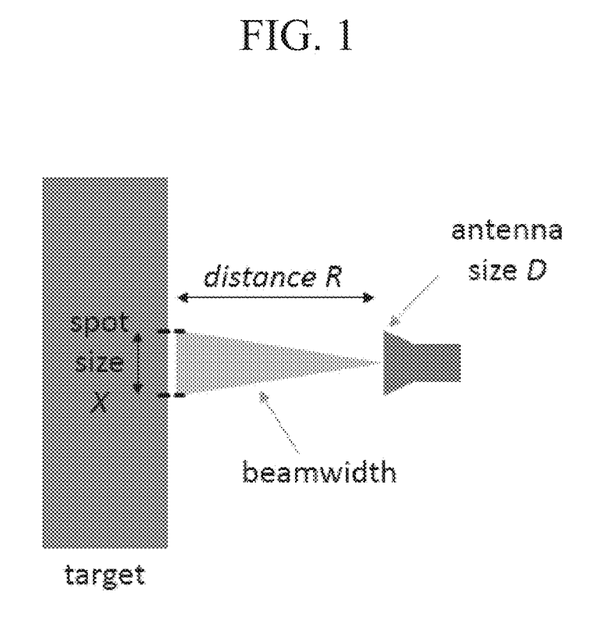
FIG. 1 is a diagram showing the relation of the spot size from a radar to the distance to the target and the beamwidth.
Figure 2:
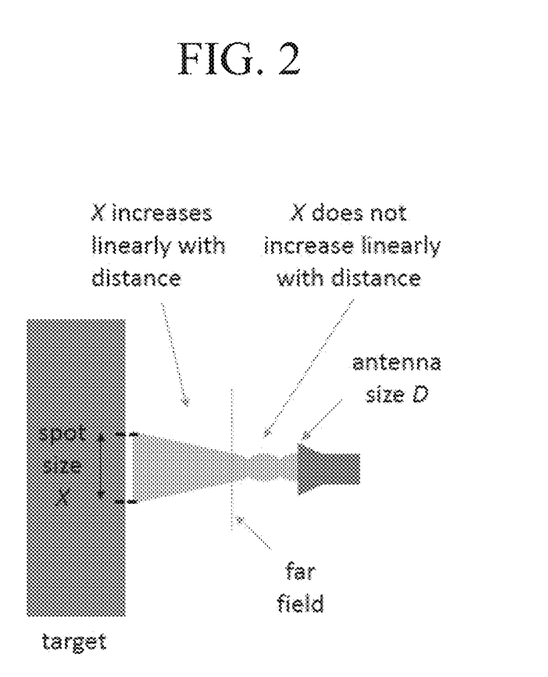
FIG. 2 is a diagram showing the near-field and far-field components of the radar beam.

Spatial resolution can also be increased by moving the radar system closer to the target. FIG. 1 shows the effect of antenna size, target distance, and beamwidth on the spot size on the target. For a given antenna size (D) and 3 dB beamwidth (BW), the spot size on the target (X) depends on the distance (R) between the target and the radar antenna. The spot size can be approximated as X=2Rtan [$\lambda$/(2D)], where $\lambda$ is the wavelength. However, moving the antenna closer to the target is not always a practical approach, as one cannot always control the distance between the radar and the target. In addition, the spot size does not decrease with the radar-target distance when the distance becomes shorter than the far-field distance $D^2/\lambda$. In fact, the minimum spot size close to the antenna is of the order of the antenna aperture size itself, as is shown in FIG. 2.

Super-resolution techniques can also be used to improve the resolution of radar systems. Super-resolution techniques, however, may require increased processing power and sophisticated algorithms. In addition, many super-resolution techniques require a high signal-to-noise ratio for efficient processing. Other techniques, such as monopulse can also be used to increase the resolution.

What is needed is a radar system with resolution independent of the range to the target.

SUMMARY

The present invention relates to improving the performance of radar, spectroscopy and imaging systems by (i) performing single or multi-pixel imaging with a single fixed beam radar regardless of the size of the radar-antenna, and (ii) providing a super-resolution of the target edges, at the order of a wavelength or less, that is independent from the target distance.

The invention, in an embodiment, further relates to a novel technique for radar imaging that achieves super-resolution of a target profile edges by placing an array of cells containing true delays or lumped delays behind the target. In an embodiment, the resolution of the radar is determined, in part, by the size of the cells. Typical cells can be of the order of a wavelength, and the resolution of the radar is of the same order. This resolution can be achieved regardless of the size of the illuminating and receiving radar antennas, and regardless of the distance between the radar and the target. The cell structure is, in an embodiment, composed of an antennas (e.g., a horn, open ended waveguide, or patch antenna) connected to a lumped-delay (such as phase shifter, capacitors, inductors, etc.) with e.g. short circuit after the lumped element or true delay element (such as a waveguides, printed microstrip line, stripline, coaxial cable, coplanar waveguide, etc.) with generally varying length or delay for each cell by e.g. short-circuiting the delay element at the desired length. The cells are placed behind the target, and the overall design does not require significant changes in the radar system itself. With the described apparatus, the spatial resolution of the radar together with the cells is determined by the size of the cells and not by the size of the radar antennas or by the radar-target distance. The cell structure can be used with any radar system, such as continuous wave, pulsed, or other.

These and other features, aspects, and advantages of the present invention will become understood with reference to the following description, appended claims, and accompanying figures.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 3:
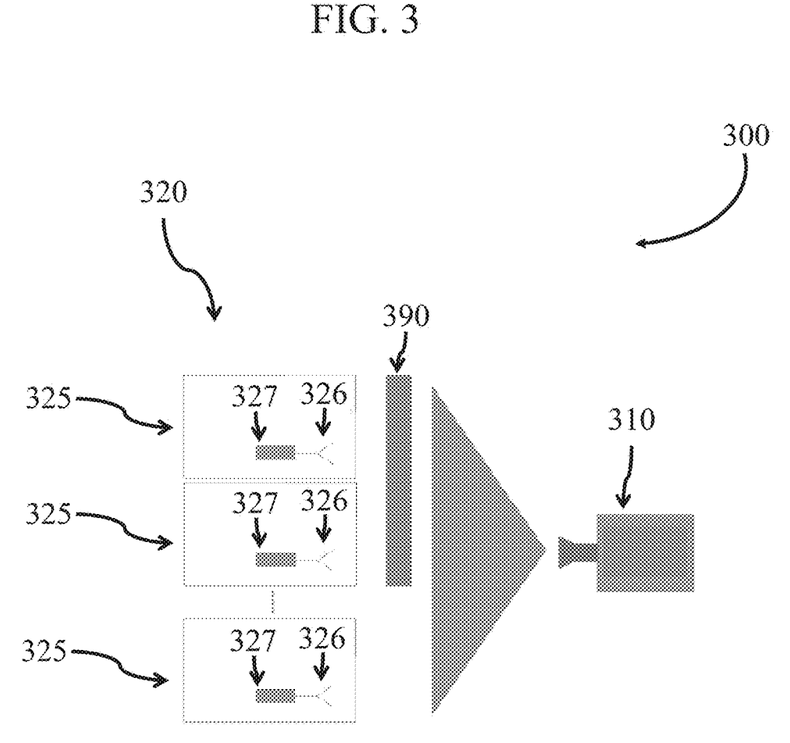
FIG. 3 is a schematic diagram of the range independent resolution radar system, according to an embodiment of the present invention.

A schematic diagram of the range independent resolution radar system, according to an embodiment of the present invention, is shown in FIG. 3. The range independent radar system 300 is composed of a radar 310 and an cell array 320. The radar 310 comprises a transmitter and a receiver. The target 390 is placed between the transmitter 310 and the cell array 320. Each cell 325 comprises a cell antenna 326 and a true delay 327. The cell antenna 326 can any type of antenna suitable for transmitting and receiving signals in the radar frequency of operation, and may be an open ended waveguide, horn, patch, dipole, slot, miniaturized antenna, or reduced size dielectric surrounded antenna. The true delay 327 can be implemented as a microstrip line, stripline, waveguide, coplanar waveguide, or any other transmission line that can guide the incoming energy received by the cell-antenna and reflect it back to the radar. Other delay elements, such as lumped elements, can be substituted for the true delay 327. Depending on the signal to noise ratio capabilities of the radar, the gain of each antenna, the losses of the transmission line and the coupling between cells and the transmission line, one can reduce the antenna size and crowd the transmission line with no inherent physical limit determined by the wavelength.

Note that the radar transmitting antenna illuminating the target and the radar receiving antenna capturing the reflections from the target can be different or could be implemented by the same antenna. Also note that in FIG. 3 the target does not necessary block all of the cells. The apparatus, system, and method of embodiments of the present invention are applicable to all the cases where it is possible to put such cells behind the target. The target may also move within the area in front of the cells, and the imaging system may generate a series of images at various times when the time the target is present. Each cell produces a delay caused by its different length. For continuous-wave radars, such as frequency-modulated continuous-wave radar, each delay would be translated to different beat frequency $f_b$ in the radar receiver. For pulsed radars, the different delay will cause the reflected signal to arrive at a different times $t_r$ at the radar receiver. The cell will have a known delay from the true delay 327, by which it will delay the radar signal. The radar receiver can determine which cells are blocked based on the presence and/or amplitude of signal corresponding to the known time delay of the cell. Starting from a case where the array is illuminated by the radar's signal and there is no target obstructing the path, the radar will measure the delay associated with all the cells in the array. In case one or more cells are blocked by the target, the $f_b$ or $t_r$ associated with these cells will not appear at the radar output. Since the position of the cells can be known and predetermined, a high resolution image of the targets profile edges or the entire target can be formed. This high resolution is enabled regardless of the radar antenna size, target-radar distance, and without the need for traditional super-resolution methods.

Figure 4:
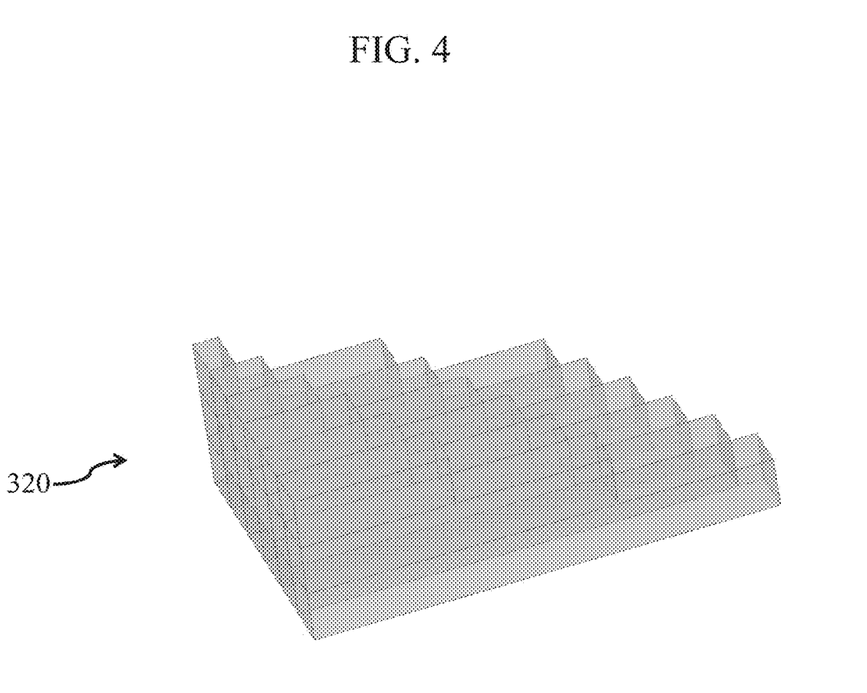
FIG. 4 is a schematic of the cell array with eighteen open-ended waveguides as antennas where each antenna is connected to a waveguide with different length by shortening the waveguide at the desired position, according to an embodiment the present invention.
Figure 5:
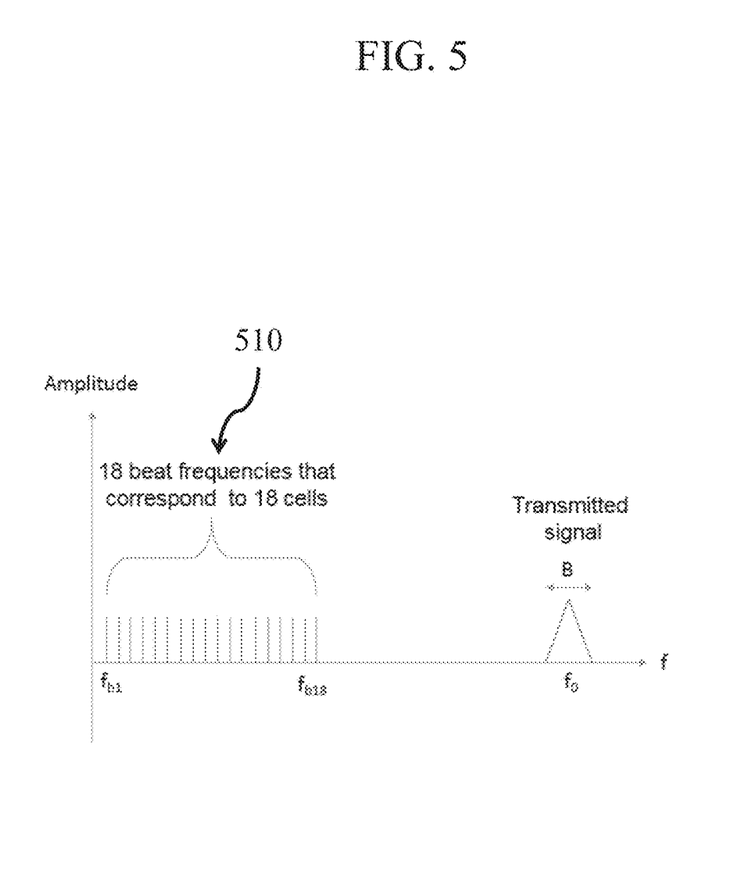
FIG. 5 is a plot of the resulting beat frequencies of a continuous wave implementation of an embodiment of the present invention.

FIG. 4 shows an embodiment of the cell array 320 according to an embodiment of the present invention with eighteen open-ended waveguides as antennas where each antenna is connected to a waveguide with different length by shortening the waveguide at the desired position. When illuminating this structure by, for example, by a frequency-modulated continuous-wave radar with signal whose frequency spectrum has bandwidth B around $f_0$, eighteen beat frequencies will be generated in the radar receiver in correspondence with the delay of each cell. A plot of the resulting beat frequencies 510, according to an embodiment of the present invention, can be seen in FIG. 5. Note that the cell array 320 structure can contain any number of cells. This number can be chosen, for example, by considering the typical cell size, the target size and the frequency of operation.

The range resolution of the radar is given as $\Delta L=c/(2B)$, where c is the speed of light and B, the bandwidth of the radar. Therefore, the difference in length between cells should be larger or equal to $\Delta L$. Although the example here is for frequency-modulated continuous-wave radar, the same structure can be used with any continuous wave, pulsed, or other types of radar. In the case of pulsed radar, the length difference of each cell will generate different delays in the radar receiver.

Figure 6A:
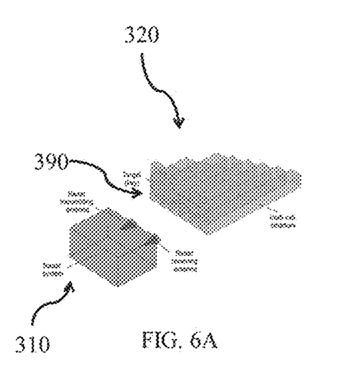
FIG. 6A is a schematic of a target present in front of the cell array, according to an embodiment of the present invention.
Figure 6B:
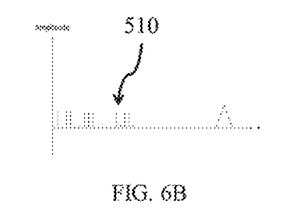
FIG. 6B is a plot of the beat frequencies present for a frequency-modulated continuous-wave radar, according to an embodiment of the present invention.
Figure 6C:
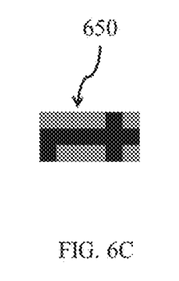
FIG. 6C is a reconstructed target image, according to an embodiment of the present invention.

FIG. 6A shows a schematic of a target 390 present in front of the cell array 320 according to an embodiment of the present invention. The target 390 will block some of the cells and other cells of the cell array 320 may be left open. When illuminating the target and the cells with a beam whose size is equal or larger than the cell array, only some of the beat frequencies 510 ($f_b$) or delays ($t_r$) that corresponds to the cells that were left open will produce corresponding signals at the radar receiver. The beat frequencies produced for a frequency-modulated continuous-wave radar, according to an embodiment of the present invention, are shown in FIG. 6B. Since the positions of the cells are known and predetermined, an image 650 of the target can be formed, as shown in FIG. 6C.

The distance between the target and the cells is not limited to any particular value. However, close distances are preferred so as to avoid diffraction effects in which cells that are blocked from direct view by the target would manage to reflect some of the energy back to the radar.

The collective field reflected back from all the cells in the structure is, in fact, an aperture field of an antenna array. Therefore, one may randomly distribute the lengths of the true delays of each cell in order to create random phase distribution on this aperture. In such a way, we minimize the possibility of beam shifting that will reduce the power propagating towards the receiving antenna of the radar.

Figure 7A:
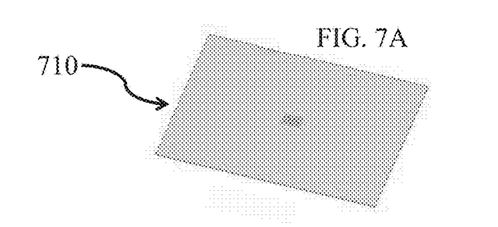
FIG. 7A is a schematic diagram of a top layer of a device, according to an embodiment of the present invention, with nine antennas.
Figure 7B:
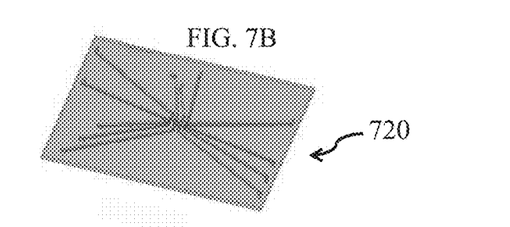
FIG. 7B is a schematic diagram of a middle signal distribution layer of a device, according to an embodiment of the present invention.
Figure 7C:
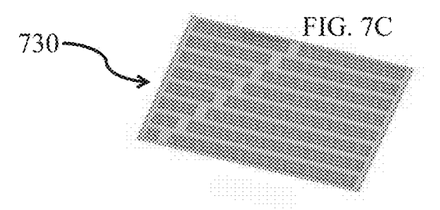
FIG. 7C is a schematic diagram of a bottom true delay line layer of a device, according to an embodiment of the present invention.
Figure 7D:
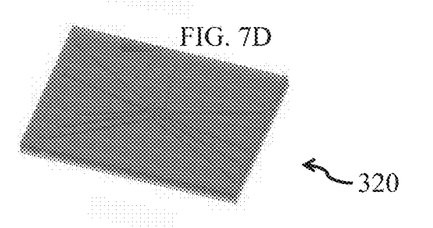
FIG. 7D is a schematic diagram of a multilayer device, according to an embodiment of the present invention.

Other configurations of the array are also possible. In an embodiment, the straight and long waveguides that appear in FIG. 4 can be replaced by a more compact structure with flat waveguide meander tunnels according to an embodiment of the present invention, as shown in FIG. 7D. The top layer 710 of the device is shown in FIG. 7A. This top layer 710 has a four by four set of open ended waveguides acting as the cell antennas. The middle layer 720 of the device is shown in FIG. 7B. This layer has distributing tunnels from the cell antennas to the true delays, which are waveguide tunnels in this embodiment. In this embodiment, the waveguide tunnels are thin tunnels. A bottom layer 730 of true delays can be seen in FIG. 7C. Note that the combined delay of a waveguide tunnel of the middle layer 720 and the true delay of the bottom layer 730 gives the known delay value of the true delay of the cell array 320. All of the layers combined can be seen in FIG. 7D, which produce the cell array 320.

Figure 8A:
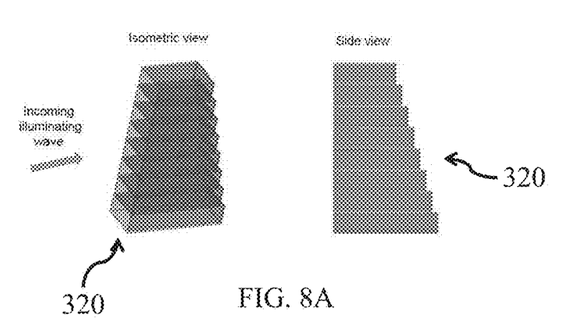
FIG. 8A is a schematic view of eight open ended waveguide antennas connected to eight waveguides with different lengths that are illuminated by an incident field, according to an embodiment of the present invention.
Figure 8B:
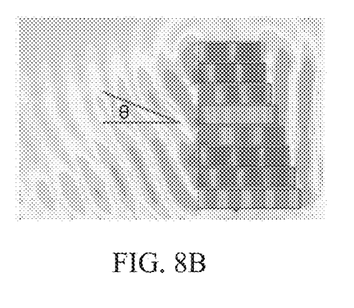
FIG. 8B is a plot of field intensities of a wave incident on the range independent resolution radar system's cell array, according to an embodiment of the present invention.
Figure 8C:
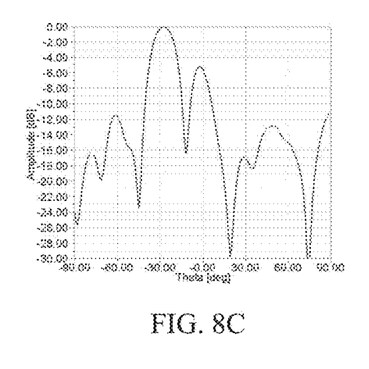
FIG. 8C is a retransmitted signal directivity plot, according to an embodiment of the present invention.

FIG. 8A shows a cell array 320 made up of eight open ended waveguide antennas connected to eight waveguides with different lengths that are illuminated by an incident field, according to an embodiment of the present invention. The illumination represents the signal transmitted by a radar. The different lengths of the waveguides are achieved by short-circuiting each waveguide to the desired length. The spatial pattern of the reflected wave is shown in FIG. 8B. This spatial pattern shows that each cell captured the illuminating wave and retransmitted a wave according to the length of the true delay. Illuminating a multi-cell structure with a radar signal, such as a pulsed signal or a continuous wave signal, generates the various output signals, such as delayed pulses or beat frequencies, from which the radar image or target profile can be produced. Note that the differences in length among the waveguides were chosen, in an embodiment, such that the retransmitted energy was steered by 30 degrees, as is seen in FIG. 8C. That is, a phase shift in each of the cells can be purposely introduced to change the direction of the retransmitted signal. However, the cells can be distributed randomly in terms of phase shifts between the cells in order to avoid beam steering of the reflected wave.

The relatively high scattered field intensities behind the waveguides seen in FIG. 8B can be reduced as desired. This reduction can be achieved by placing radar absorbing materials around the cells aperture.

In addition to the frequencies reflected from the target and the structure, the amplitude of the reflected wave can be used for attaining additional information about the target. In the case of a frequency-modulate continuous-wave radar, the frequency received corresponding to a particular cell may have lower amplitude when the cell is partially blocked. The degree of the attenuation can aid in determining the extent of blockage by the target. The attenuated signal can also be used to further enhance the spatial resolution beyond the cell size. The signal attenuation can also be used for detecting material properties. For highly conducting metallic target, the blocked cells will emit little or no energy. If the target is made of other, only partially absorbing materials, cells that are blocked by the target may be able to reflect some of the energy back to the radar. In this way, the system can be used to characterize the material composition of the target, particularly at the radar operation frequency. Note that a partially transparent object will not obstruct the radar beam, thereby allowing the corresponding returned signal (e.g., beat frequency components in frequency-modulated continuous-wave radar or delayed pulses in pulsed radar) to appear, although attenuated. If the amplitude information is considered, the target object's image is still generated by noting that the corresponding frequencies return with lower power due to attenuation. The attenuated signal can provide information on the transparency of the object, which is determined by the material, its thickness, and its shape.

The system can also aid in the determination of the target thickness. The characteristics of the returned signal will be dependent on the target thickness for some materials. In the case of cells that partially blocked or partially transparent, reference frequency signals and additional beat frequencies signals that correspond to energy travelling back and forth multiple times to the cell are generated. This information can be used to determine the target thickness in these cases. Furthermore in the case of continuous wave radar, cells that are partially blocked may generate frequencies that correspond to waves travelling back and forth multiple times to and from the cells before they are received by the radar. These frequencies will indicate that they are not fully blocked, improving the spatial resolution to a size below the cell size. Spatial resolution better than the wavelength can be obtained if the distance of the blocking object from the delay line aperture is shorter than a wavelength, and if the aperture size of the delay lines itself is smaller than a wavelength. The limit to the spatial resolution is the aperture dimension as long as the delay line is able to guide a wave at the given small aperture dimension.

Figure 9:
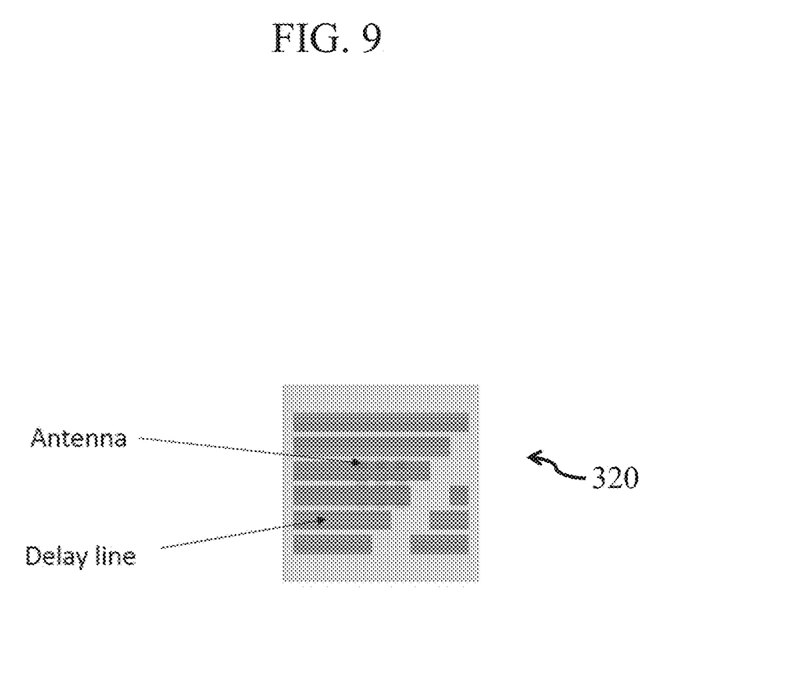
FIG. 9 is a barcode like device, according to an embodiment of the present invention.

The cell array 320 may also be configured to create a barcode like device. The barcode like device, according to an embodiment of the present invention, is shown in FIG. 9. This low-profile device has nine patch antennas and nine printed transmission lines with each transmission line connected to an antenna. By using a phased array or a focal plane array, the beam of the radar can be focused or directed towards any of the cells separately. In this case, other applications such as a wireless barcode can be implemented. Each cell can be connected to a certain length and repetitions between true delay lengths are allowed since the beam is pointed to a specific cell and read its delay, generating a numerical value based on the delay. These numerical values can be combined into a barcode value. Since the total number of possibilities, even with low number of cells, is very large, a barcode like device can be implemented.

Figure 10:
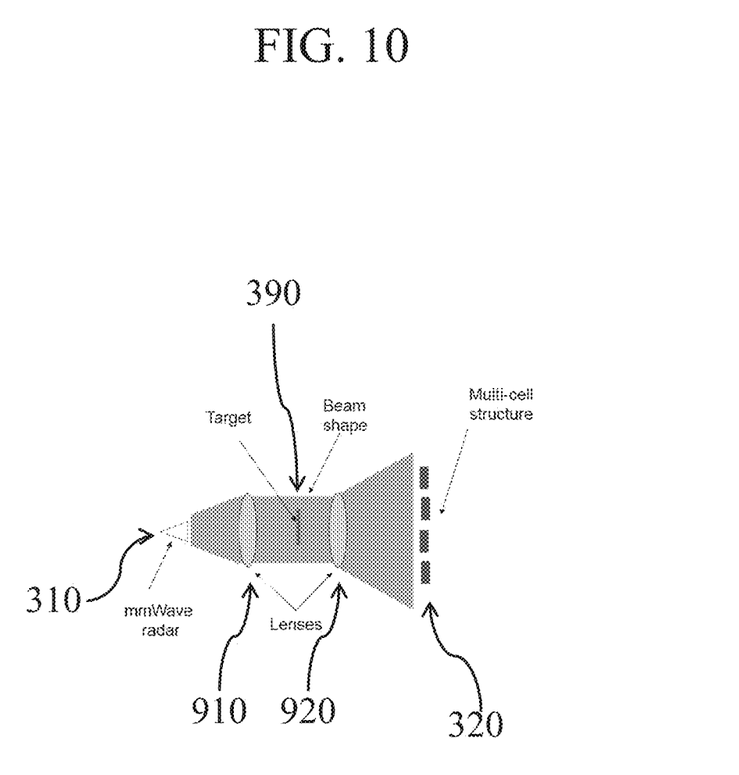
FIG. 10 is range independent resolution radar system incorporating lenses, according to an embodiment of the present invention.

A method for improving the resolution for targets smaller than the cell array, according to an embodiment of the present invention, is shown in FIG. 10. If a small target is placed in front of a multi-cell structure and blocks only small number of cells, the resolution of the formed image can be improved by adding a first lens 910 and a second lens 920, placing the target 390 between the lenses, and locating the cell array 320 after the second lens 920 as shown. In this way, the target's projected shape on the cells is larger, and more cells are effectively blocked. This lens system leads to improvement in the image resolution in comparison to the case without the lenses.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. To the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, those skilled in the art will appreciate that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. An apparatus for imaging, the apparatus comprising:
   a. a radar transmitter configured to transmit a radar signal; and
   b. a cell array positioned behind a target to be imaged, the cell array comprising:
   a plurality of cells, each cell comprising an antenna and a delay element, wherein the each cell is configured to receive the radar signal from the radar transmitter and to retransmit the radar signal after a known time delay from the delay element; and
   c. a radar receiver configured to receive the retransmitted radar signal from the cell array, and to generate an image of the target based on receipt of the retransmitted radar signals based on the position of the target.

2. The apparatus of claim 1, wherein each delay element is a true delay.

3. The apparatus of claim 1, wherein the radar receiver performs, for each cell, the steps of:
   a. determining a first pixel value, wherein the first pixel value is based on the first known time delay and an amplitude of the received retransmitted radar signal for the cell; and
   b. shading an image location of the first pixel value based on a location of the first cell.

4. The apparatus of claim 1, wherein the radar transmitter is a continuous wave transmitter, and each cell is configured to produce a known beat frequency at the radar receiver from the transmitted radar signal and the retransmitted radar signal.

5. The apparatus of claim 1, wherein the radar signal transmitter is a pulsed transmitter, and the radar receiver constructs an image of a target by determining an amplitude of the retransmitted radar signal with the first known time delay.

6. The apparatus of claim 1, wherein each antenna comprises a waveguide antenna and each delay element comprises a waveguide.

7. The apparatus of claim 1, wherein each antenna comprises a patch antenna and each delay element comprises a microstrip line.

8. The apparatus of claim 1, further comprising a lens located between each cell and the radar transmitter.

9. A method for imaging, the method comprising:
   a. transmitting a first radar signal by a radar transmitter;
   b. receiving at least some portion of the radar signal at an antenna of each of a plurality of cells positioned behind a target to be imaged;
   c. generating, by delay element in each cell, a time delayed signal based on the received at least some portion of the radar signal;
   d. retransmitting the first time delayed signal by the antenna of each cell;
   e. receiving the at least some portion of time delayed signal from each cell by a radar receiver; and
   f. constructing an image of the target, wherein constructing the image comprises determining an absence of the target at each cell based on a presence of the time delayed signal from each cell and a presence of the target at each cell based on an absence of the time delayed signal from each cell.

10. The method of claim 9, wherein the delay element of each cell is a true delay.

11. The method of claim 9, wherein the radar constructing a radar image comprises for each cell:
    a. determining a pixel value, wherein the pixel value is based on the time delayed signal for the cell; and
    b. shading the image location of the pixel value based on a location of the cell antenna.

12. A system for imaging, the system comprising:
    a radar, wherein the radar comprises:
      1. a radar transmitter configured to generate a radar signal, and
      2. a radar receiver; and
    b. a cell array positioned behind a target to be imaged, wherein the cell array comprises:
      a plurality of cells, wherein each cell comprises an antenna and a delay element connected to the antenna, wherein the antenna and the delay element are configured to receive the radar signal, generate a time delayed radar signal by the delay element, and transmit the time delayed radar signal such that at least some portion of the time delayed radar signal is incident on the radar receiver,
      wherein the radar receiver is configured to generate an image of the target based on receipt of the retransmitted radar signals based on the position of the target.

13. The system of claim 12, wherein the delay element is a true delay.

14. The system of claim 12, wherein the radar receiver constructs a radar image by
    determining a pixel value for each cell, wherein the pixel value is based on the time delayed radar signal from the cell;
    and
    arranging the pixel values into an image by shading an image location of each pixel value based on a location of each cell.

15. The system of claim 12, wherein:
    a. the radar transmitter is configured to direct a beam at each cell; and
    b. the radar receiver is configured to record a numerical value for each cell based on the time delayed radar signal from the cell, and to combine the numerical values for each cell into an electronic barcode value.

16. The system of claim 12, wherein the antennas are located on a first layer, and the true delays are located on a second layer.

17. The system of claim 16, wherein the antennas are connected to the true delays by a thin tunnel waveguide.

18. The system of claim 12, wherein the radar transmitter is a continuous wave transmitter, and each cell is configured to produce a different known beat frequency at the radar receiver.

19. The system of claim 12, wherein each antenna comprises a waveguide antenna and each delay element comprises a waveguide.

* * * * *